United States Patent [19]

Crivello et al.

[11] Patent Number: 4,780,511

[45] Date of Patent: Oct. 25, 1988

[54] METHOD FOR MAKING POLYMERIC PHOTOACTIVE ARYL IODONIUM SALTS, PRODUCTS OBTAINED THEREFROM, AND USE

[75] Inventors: James V. Crivello, Clifton Park; Julia L. Lee, Schenectady, both of N.Y.

[73] Assignee: General Electric Company, Schenectady, N.Y.

[21] Appl. No.: 64,433

[22] Filed: Jun. 22, 1987

[51] Int. Cl.$^4$ .............................. C08F 8/34; C08F 8/18
[52] U.S. Cl. .................................. 525/353; 525/356; 525/367; 525/385
[58] Field of Search ............... 525/353, 355, 356, 357, 525/367, 385

[56] References Cited

PUBLICATIONS

Chem. Abst., 105, 200643k, (1986).
Y. Yamada, K. Kashima, M. Okawara, "Synthesis of Tetrameric Iodonium Ion", Polymer Letters Edition, vol. 14, (1976), pp. 65–71.
Y. Yamada & M. Okawara, "Syntheses & Reactions of Functional Polymers, LXIII. Syntheses of Phenyl Polystyryliodonium Salts", Die Makromolekulare Chemie, 152, (1972), pp. 153–162.

Primary Examiner—Christopher Henderson
Attorney, Agent, or Firm—William A. Teoli; James Magee, Jr.; James C. Davis, Jr.

[57] ABSTRACT

Polymeric photoactive iodonium salts are provided which are useful as photoinitiators and thermal initiators when used in combination with copper salts for cationically polymerizable organic materials. Methods for making the photoactive polymeric iodonium salts also are provided.

3 Claims, No Drawings

METHOD FOR MAKING POLYMERIC PHOTOACTIVE ARYL IODONIUM SALTS, PRODUCTS OBTAINED THEREFROM, AND USE

BACKGROUND OF THE INVENTION

The present invention relates to photoactive iodonated aromatic organic polymers, a method for making photo curable and heat curable compositions using such materials.

As shown by Crivello et al., U.S. Pat. No. 4,151,175, assigned to the same assignee as the present invention and incorporated herein by reference, diarylhalonium salts can be made by initially forming a diaryl iodonium bisulfate and thereafter effecting a metathesis reaction with a counterion source.

Polymer bound iodonium salts have been described as shown by Yamada and Okawara, Die Macromol. Chemie., 152, 153 (1972) by effecting reaction between iodinated polystyrene, benzene and sulfuric acid, or polystyrene with phenyl iodoso acetate in sulfuric acid. Although the resulting diaryl iodonium bisulfates were further metathesized with various counter ions, effective photoactive polymeric diaryl iodonium salts were never reported. The present invention is based on our discovery that photoactive poly(diaryl iodonium salt) can be made by effecting reaction between iodonated aromatic organic polymer, a peracid, a $C_{(1-13)}$ organic sulfonic acid and a $C_{(6-13)}$ aryl organic compound to produce a poly(diaryl iodonium sulfonate). The poly(diaryl iodonium sulfonate) can then be further reacted with a polyfluoro metal or metalloid salt to provide a photoactive poly(diaryl iodonium salt), useful as a photoinitiator for polymerizing cationically polymerizable organic materials.

STATEMENT OF THE INVENTION

There is provided by the present invention, a method for making photoactive, poly(diaryl iodonium salt) which comprises (1) treating iodonated aromatic-organic polymer comprising chemically combined $C_{(6-13)}$ divalent aromatic organic groups, with a $C_{(1-13)}$ organic sulfonic acid in the presence of a peracid, (2) further reacting the resulting aromatic organic polymeric sulfonate of (1) with an aromatic organic compound selected from $C_{(6-13)}$ aromatic hydrocarbons $C_{(6-13)}$ aromatic hydrocarbons substituted with radicals inert during reaction, (3) effecting the metathesis of the resulting poly(diaryliodonium sulfonate) of (2) with an alkali metal, or alkaline earth metal polyhalometal, or metalloid salt to form a polymeric photoactive diaryliodonium salt having from 0.001 to 0.3 equivalent, per 100 grams of polymer, of chemically combined polyhalometal or metalloid groups of the formula, $$I^+MX_n^-, \qquad (1)$$

where M is a metal or metalloid, X is a halogen radical, and n is an integer equal to 4 to 6 inclusive.

In a further aspect of the present invention, there is provided a method for making photoactive, poly(diaryl iodonium salt), which comprises, (1) effecting reaction in the presence of an acid, between an aryliodoso sulfonate and a $C_{(6-13)}$ aromatic organic compound having at least one nuclear bound condensable hydrogen and a chemically combined polymerizable or copolymerizable functional group to produce the corresponding diaryliodonated sulfonate, (2) effecting a metathesis of the diaryliodonated sulfonate with a polyhalometal, or metalloid salt of the formula, $$YMX_n, \qquad (2)$$

to produce the corresponding photoactive polyhalometal, or polyhalometalloid diaryliodonium salt, (3) polymerizing, or copolymerizing the resulting diaryliodonium salt of (2) to form a photoactive poly(diaryliodonium salt), where Y is a member selected from the class consisting of hydrogen, an alkali metal, or alkaline earth metal, and M, X and n are as previously defined.

In an additional aspect of the present invention, there is provided a photocurable composition comprising a cationically polymerizable organic material and an effective amount of a photoactive polymeric diaryl iodonium salt having chemically combined groups of formula (1).

Some of the polyhalometal or metalloid salts of formula (2) which can be used in the practice of the present invention are, for example, $NaSbF_6$, $KPF_6$, $NaAsF_6$, $KAsF_6$, $Ca(PF_6)_2$, $Mg(AsF_6)_2$, $HPF_6$, $HAsF_6$, $HSbF_6$, $Ba(AsF_6)_2$, $(PF_6)_2$, $Zn(AsF_6)_2$, $NaBF_4$, etc.

Among the aromatic organic polymers which can be converted to photoactive, poly(diaryl iodonium salt)s, there are included polystyrene poly-$\alpha$-methylstyrene, poly-2,6-dimethyl-1,4-phenylene oxide, polyacenaphthalene, poly-1-vinylnaphthalene, poly-2-phenoxyethyl vinyl ether, polyphenylacrylate, polyglycidylphenyl ether, etc.

There are included by the aromatic organic compounds having a chemically combined polymerizable or copolymerizable functional group which can be used to make poly(diaryl iodonium salts) in accordance with the practice of the present invention, are compounds such as styrene, $\alpha$-methylstyrene, vinylnapthalene, phenylacrylate, phenylmethacrylate, 2-vinylanisole, 3-vinylanisole, 3-methylstyrene, 2,6-dimethylstyrene, allylphenylether, phenylglycidyl ether.

The following shows a preferred synthesis of photoactive poly(diaryl iodonium salt)s by hydroxy tosylating iodonated polystyrene and effecting reaction with the resulting iodoso tosylate with anisole and potassium hexafluoro phosphate.

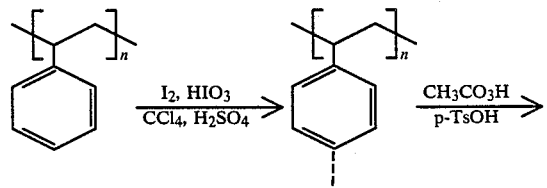

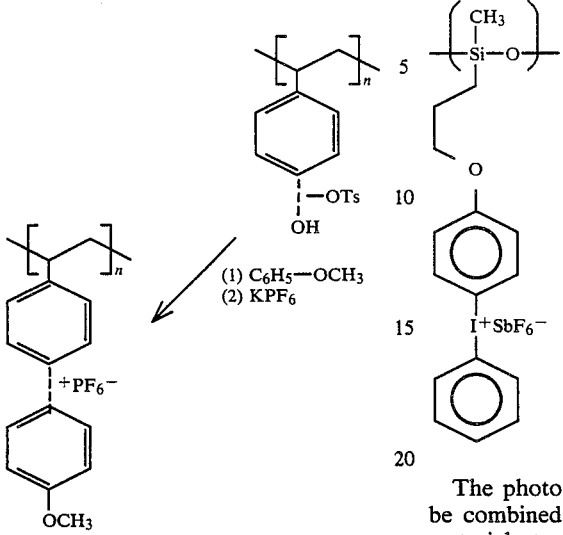

An alternate method for making photoactive poly(-diaryl iodonium salt) utilizing a functionalized aromatic compound and an aryliodosotosylate to make a photoactive functionalized diaryliodonium salt followed by the addition of such diaryliodonium salt onto a polymeric methyl hydrogen siloxane to give a methyl polysiloxane having pendant photoactive diaryliodonium groups is shown as follows:

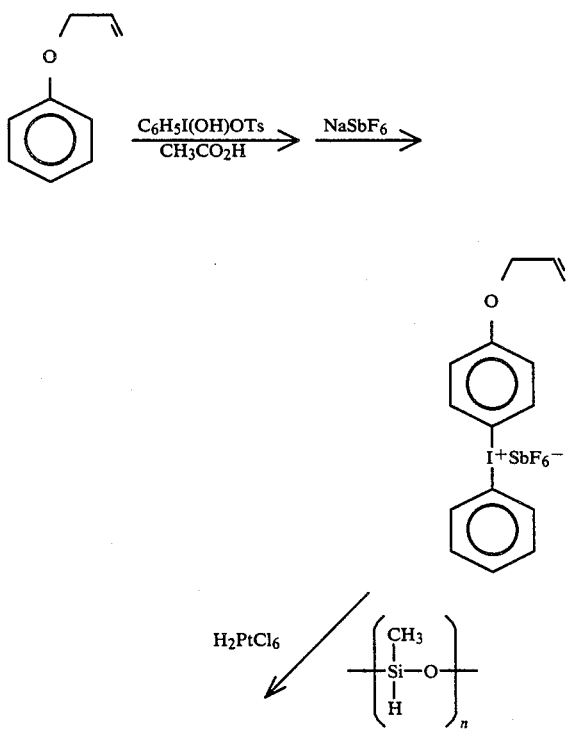

The photoactive polymeric aryl iodonium salts can be combined with cationically polymerizable organic materials to produce photocurable compositions. An effective amount of photoactive polymeric aryl iodonium salt will be an amount sufficient to provide from 0.001 to 0.02 equivalents of halometal groups of formula (1), per 100 grams cationically polymerizable functional groups of the organic material used.

Some of the cationically polymerizable materials which can be used to make the photocurable compositions are, for example, any monomeric, dimeric, oligomeric or polymeric epoxy material containing one or a plurality of epoxy functional groups. For example, those resins which result from the reaction of bisphenol-A (4,4'-isopropylidenediphenol) and epichlorohydrin, or by the reaction of low molecular weight phenol-formaldehyde resins (novolak resins) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxy-siloxane resins, epoxy-polyurethanes and epoxy-polyesters. Such polymers usually have epoxy functional groups at the ends of their chains. Epoxy-siloxane resins and method for making are more particularly shown by E. P. Plueddemann and G. Fanger, J. Am. Chem. Soc. 81, 632–5 (1959). As described in the literature, epoxy resins can also be modified in a number of standard ways such as reactions with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,850; 3,567,797; 3,677,995; etc. Further examples of epoxy resins which can be used are shown in the Encyclopedia of Polymer Science and Technology, Vol. 6 (1967), Interscience Publishers, New York, pp. 209–271.

Included by the vinyl organic monomers which can be used in the practice of the invention to make the polymerizable compositions covertible to thermoplastic polymers are, for example, styrene, vinyl acetamide, α-methylstyrene, isobutyl vinyl ether, n-octyl vinyl ether, acrolein, β-pinene; vinyl arenes such as 4-vinyl biphenyl, 1-vinyl pyrene, 2-vinyl fluorene, acenaphthylene, 1 and 2-vinyl naphthylene; N-vinyl carbazole, N-vinyl pyrrolidone, 3-methyl-1-butene; vinyl cycloaliphatics such as vinylcyclohexane, vinylcyclopropane, 1-phenylvinylcyclopropane, isobutylene; dienes such as isoprene, butadiene, 1,4-pentadiene, etc.

Some of the vinyl organic prepolymers which can be used to make the polymerizable compositions of the present invention are, for example, $CH_2=CH-O-(CH_2-CH_2O)_n-CH=CH_2$, where n is a positive integer having a value up to about 1000 or higher; multi-functional vinylethers, such as 1,2,3-propane trivinyl ether, trimethylolpropane trivinyl ether, prepolymers having the formula,

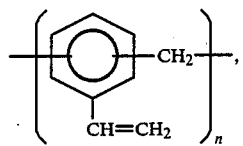

low molecular weight polybutadiene having a viscosity of from 200 to 10,000 centipoises at 25° C., etc. Products resulting from the cure of such compositions can be used as potting resins, crosslinked coatings, printing links, etc.

A further category of the organic materials which can be used to make polymerizable compositions are cyclic ethers which are convertible to thermoplastics. Included by such cyclic ethers are, for example, oxetanes such as 3,3-bischloromethyloxetane, alkoxyoxetanes as shown by Schroeter, U.S. Pat. No. 3,673,216, assigned to the same assignee as the present invention; oxolanes such as tetrahydrofuran, oxepanes, oxygen containing spiro compounds, trioxane, dioxolane, etc.

In addition to cyclic ethers there are also included cyclic esters such as β-lactones, for example, propiolactone, cyclic amines, such as 1,3,3-trimethylazetidine and organosilicon cyclics, for example, materials included by the formula,

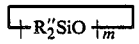

where R" can be the same or different monovalent organic radicals such as methyl or phenyl and m is an integer equal to 3 to 8 inclusive. An example of an organosilicon cyclic is hexamethyl cyclotrisiloxane, octamethyl tetrasiloxane, etc. The products made in accordance with the present invention are high molecular weight oils and gums.

The photocurable compositions of the present invention can be made by blending the photoactive iodonium polymer with the cationically polymerizable material, referred to hereinafter as the "epoxy resin". The resulting curable composition can be in the form of a varnish, having a viscosity of from 1 centipoise to 100,000 centipoises at 25° C. or a free flowing powder can be applied to a variety of substrates by conventional means and cured to the tack free state by the application of ultraviolet light or a combination of ultraviolet light and heat.

Depending upon the compatability of the onium salt with the epoxy resin, the photoactive polymer can be dissolved or dispersed therein along with an organic solvent such as nitromethane, acetonitrile, etc., prior to its incorporation. In instances where the epoxy resin is a solid, incorporation of the photoactive polymer can be achieved by dry milling or by melt mixing the resin whereby the onium salt is incorporated.

Depending upon the nature of the epoxy resin, curable compositions of the present invention can be used as molding compounds, adhesives, printing inks, calks and can be applied to such substrates as metal, rubber, plastic, molded parts of films, paper, wood, glass, cloth, concrete, ceramic, etc. The curable compositions may contain inactive ingredients, such as inorganic fillers, eyes, pigments, extenders, viscosity control agents, UV screens, etc., in amounts of up to 100 parts of filler per 100 parts of cationically polymerizable organic material.

Heat curable compositions also can be made incorporating a cocatalyst with the photocurable mixture such as 0.01 part to 10 parts of copper salt by weight per part of heat curable mixture. Some of the copper salts which can be used include, for example, Cu(I) salts such as copper halides, e.g., Cu(I) chloride etc; Copper (II) salts such as Cu(II) benzoate, Cu(II) acetate, Cu(II) stearate, Cu(II) gluconate, Cu(II) citrate, etc.

In the practice of one form of the present invention, iodonation of organic polymer can be achieved by effecting reaction between the organic polymer and iodine pentoxide, sulfuric acid, and in the presence of a substantially inert organic solvent. The mixture can be heated at a temperature in the range of from 0 to 100° C. while being agitated. Reaction time can last from 2 to 150 hours.

The resulting iodonated aromatic polymer can be tosylated by effecting reaction between the polymer and a peracid such as peracetic acid in the presence of an organic solvent along with agitation. There then can be added an organic sulfonic acid. Suitable organic sulfonic acids are p-toluene sulfonic acid, benzene sulfonic acid, o-xylene sulfonic acid, p-nitrobenzene sulfonic acid, methane sulfonic acid, trifluoromethane sulfonic acid, and naphalene sulfonic acid. A suitable aromatic compound, as previously defined, for example, anisole can be used in combination to form the corresponding polymeric diaryliodonium tosylate. If desired, there can be used a polymeric aromatic iodoso tosylate to form the poly(diaryl iodonium tosylate) directly.

Metathesis reaction between the polyhalometal or metalloid salts and the polymeric iodonium tosylate can be achieved by adding an effective amount of an alkali metal halometaloid metal salt of formula (2) to an organic solvent solution of the polymeric diaryliodonium tosylate. There can be utilized sufficient alkali metal polyhalometalloid salt to provide a stoichiometric equivalence between polyhalometal anion, per gram of polymer.

The photoactive polymeric iodonium salts of the present invention can be used as photoinitiators to effect the polymerization of cationically polymerizable material, such as epoxy resins, or vinyl ethers. There can be used sufficient photoactive polymeric iodonium salt to provide from 0.001 to 0.02 equivalents of polyhalometal or metalloid groups of formula (1) per 100 grams of cationically polymerizable organic material.

The following examples are given by way of illustration and not by way of limitation. All parts are by weight.

EXAMPLE 1

A mixture of 32 grams of polystyrene ($MW_n=3800$), 32 grams (0.25 mole) of iodine, 12 grams (0.04 mole) iodine pentoxide, 40 ml of carbon tetrachloride, 60 ml of 50% sulfuric acid and 400 ml of nitrobenzene was heated at 90° C. with stirring for 72 hours. The mixture was then poured into methanol and the precipitated product was recovered by filtration. The product was then redissolved in chloroform and precipitated again into methanol. It was dried overnight in vacuo at 60° C. to provide 50 grams of 4-iodopolystyrene.

There was slowly added 45.6 grams of a 40% peracetic acid solution to 23 grams (0.1 mole) of 4-iodopolystyrene and 40 ml of methylene chloride. An exothermic reaction resulted which was maintained at 30° C. or below by external cooling. Addition of the peracetic acid was completed after 45 minutes and stirring of the resulting mixture was continued for one hour. There was added 19.05 grams (0.1 mole) of para-toluenesulfonic acid monohydrate and 10.8 grams (0.1 mole) of anisole to the resulting pale yellow clear solution. Exothermic reaction occurred and the mixture was maintained at about 30° C. for one hour with stirring by external cooling. The resulting pale yellow solution was poured into water to precipitate the product. It was recovered by filtration. Based on method of preparation, the product was polymeric 4-methoxyphenyl styryl iodonium tosylate.

The polymeric iodonium tosylate was dissolved in a 1:1 mixture of methanol and methylenechloride and 25.9 grams (0.1 mole) of sodium hexafluoroantimonate was added to the solution. As reaction occurred, the polymer dissolved to give a homogeneous solution. The sodium tosylate by-product was removed by filtration and the solvents were removed by rotary evaporator. There was obtained 54 grams of 4-methoxyphenyl-polystyryliodonium hexafluoroantimonate.

A one mil film of limonene dioxide containing 1% by weight of the above described 4-methoxyphenylpolystyryliodonium hexafluoroantimonate was spread onto a glass plate. The film was irradiated using a GE H3T7 medium pressure mercury arc lamp positioned at a distance of 4" from the lamp. A 3-second exposure was required to cure the film to a tack-free state.

There was added 0.1% of copper acetylacetonate to 3,4-epoxycyclohexylmethyl-3',4'-epoxycyclohexanecarboxylate containing 2% by weight of the above-described polystyryliodonium hexafluoroantimonate salt. The mixture was heated at 145° C. for several minutes to convert the epoxy compound to a hard cured mass.

The above procedure was repeated except that 24.5 grams (0.1 mole) of poly-α-methylstyrene was substituted for polystyrene. The metathesis of reaction was performed in methylethylketone as solvent. There was obtained 4.12 grams (72.03) of friable pale-yellow catalyst. A 1% solution of the catalyst was dissolved in limonene dioxide to produce a tack-free cured product in 3 seconds when irradiated as described above.

EXAMPLE 2

There was added a 20 ml of glacial acetic acid and 9.8 grams (0.025 mole) of phenyliodosotosylate in small portions to a solution of 8.2 grams (0.05 mole) of polyphenoxyethylvinylether in 20 ml of methylene chloride. Reaction was allowed to proceed for two hours and then diethylether was added to precipitate the polymer. The polymer was separated from the solution and dissolved in 15 ml of acetone. There was added to the solution, 7.9 grams of sodium hexafluoroantimonate dissolved in 25 ml of acetone, the entire mixture warmed slightly and allowed to stir for one hour. Reaction mixture was filtered to remove the sodium tosylate and the acetone was removed under reduced pressure. There was obtained a very viscous oil. Based on method of preparation, the product was a polyvinylether having chemically combined diphenyliodonium hexafluoroantimonate groups. A 10% solution of the polymeric iodonium salt in 4 vinylcyclohexene dioxide was irradiated as described in Example I. There was obtained a tack-free cured film after two seconds of irradiation.

EXAMPLE 3

There were added 20 ml of glacial acetic acid and 19.6 grams (0.05 mole) of phenyliodosotosylate, to 15 grams of polyphenylglycidylether dissolved in 15 ml of methylenechloride. After stirring the mixture for two hours, about 100 ml of diethylether was added to precipitate reaction product. Based on the method of preparation, the reaction product was a polyphenylglycidylether having chemically combined phenyliodoniumtosylate groups. The polymer was suspended in acetone and 15 grams of sodium hexafluoroantimonate in 25 ml of acetone was added. Rapid precipitation of sodium tosylate occurred and the solution was filtered. The removal of acetone under reduced pressure resulted in the production of a polyphenylglycidylether having chemically combined diphenyliodonium hexafluoroantimonate salt groups.

A 1% solution of the photoactive polymeric diaryliodonium salt dissolved in limonene dioxide gave a tack-free coating after one second irradiation in accordance with the procedure of Example 1.

EXAMPLE 4

There was added in small portions, 78.4 grams (0.2 mole) of phenyliodosotosylate to 40 grams (0.3 mole) of allylphenylether and 150 ml of glacial acetic acid. Reaction mixture was allowed to stir at room temperature for 1.5 hours and then anhydrous ether was added to precipitate the iodonium salt. After a vacuum filtration and washing with water, there was obtained 100 grams of product having a melting point of 90°-95° C. Based on method of preparation, the product was 4-allyloxyphenyl phenyliodoniumtosylate.

There was added 51.8 grams (0.2 mole) of sodium hexafluoroantimonate to 100 grams of the above tosylate salt dissolved in hot methylethylketone. The entire mixture was maintained at 70° C. with stirring for one hour. The resulting sodium tosylate was filtered off and the methylethylketone was removed under reduced pressure. A 97% yield of 4-allyoxyphenyl phenyliodonium hexafluoroantimonate was obtained as a viscous oil.

There was added two drops of a platinum catalyst as shown by Karstedt, U.S. Pat. No. 3,775,452, to a mixture of 20 grams of a silicone copolymer consisting essentially of chemically combined dimethylsiloxy units and methylhydrogensiloxy units dissolved in 40 ml of tetrahydrofuran and 5.73 grams (0.01 mole) of the above 4-allyloxyphenyl phenyliodonium hexafluoroantimonate. The reaction mixture was stirred for 3 hours at 30° C. and then at 25° C. for 48 hours. There was then added 0.84 grams (0.01 mole) of 1-hexene and two additional drops of the platinum catalyst, and the mixture was stirred for two additional hours. The mixture was then stripped of tetrahydrofuran under reduced pressure resulting in the production of a gray viscous oil.

Based on method of preparation, there was obtained a polymer consisting essentially of chemically combined dimethyldisiloxy units and methylpropyldiphenyliodonium hexafluoroantimonate siloxy units.

A 1% solution of the above photoactive diaryliodonium silicone oil in limonene dioxide resulted in a tack-free coating when irradiated for 5 seconds, in accordance with the procedure of Example 1.

EXAMPLE 5

There was added 19.86 grams (0.05 mole) of phenyliodosotosylate to a mixture of 7.5 grams (0.05 mole) of phenylglycidylether in 50 ml of methylenechloride. The reaction mixture was warmed to 40° C. and stirred for one hour. Based on method of preparation, there was obtained 4-phenyl-4'-glycidyloxyphenyliodoniumtosylate. There was then added 15 grams of sodium hexafluoroantimonate in 25 ml of acetone to the reaction mixture. The sodium tosylate which was formed was removed by filtration and the acetone in methylenechloride was removed on a rotary evaporator. A light yellow oil remained. Based on method of preparation, the resulting product was 4-phenyl-4'-glycidyloxyphenyliodonium hexafluoroantimonate. Brief exposure to UV irradiation produced a rapid polymerization of the compound.

The solution of 1% by weight of the resulting photoactive polymeric diphenyliodonium hexafluoroantimonate salt and limonenedioxide resulted in a rapid polymerization of the mixture to a tack-free state in a few seconds of UV irradiation.

Although the above examples are directed to only a few of the very many variables which can be used in the practice of the method of the present invention, it should be understood that the present invention is directed to the production of a much broader variety of polymeric photoactive aryliodonium salts as shown in the description preceeding these examples.

What is claimed and sought to be protected by Letters Patent of the United States is as follows:

1. A method for making photoactive poly(diaryl iodonium salt) which comprises,
    (1) iodonating an aromatic organic polymer selected from the class consisting of polystyrene, poly-α-methylstyrene, poly-2,6-dimethyl-1,4-phenylene oxide, polyacenaphthalene, poly-1-vinylnaphthalene, poly-2-phenoxyethyl vinyl ether, polyphenylacrylate, and polyglycidylphenyl ether,
    (2) oxysulfonating the resulting iodonated aromatic organic polymer (1) in the presence of a peracid and an organic sulfonic acid,
    (3) further reacting the resulting poly(aromatic iodososulfonate) of (2) with aromatic organic compound having at least one available nuclear-bound hydrogen atom,
    (4) effecting the metathesis of the resulting poly(diaryl iodonium sulfonate) of (3) with an alkali metal, or alkaline earth metal polyhalometal, or metalloid salt to form a polymeric photoactive diaryl iodonium salt having from 0.001 to 0.03 equivalents, per 100 grams of polymers of chemically combined polyhalometal, or metalloid groups of the formula, $$I_+MX_n^-,$$

where M is a metal or metalloid, X is a halogen radical, and n is an integer equal to 4 to 6 inclusive.

2. A method in accordance with claim 1, where the aromatic organic polymer is polystyrene.

3. A method in accordance with claim 1, where the polyhalometal salt is $NaSbF_6$.

* * * * *